United States Patent
Madhavapeddi et al.

(10) Patent No.: US 7,188,188 B1
(45) Date of Patent: Mar. 6, 2007

(54) METHODS AND COMPUTER PROGRAM PRODUCTS FOR PROVIDING NETWORK QUALITY OF SERVICE FOR WORLD WIDE WEB APPLICATIONS

(75) Inventors: Shreedhar Madhavapeddi, Seattle, WA (US); Rajesh Sundram, Redmond, WA (US); Eric L. Eilebrecht, Sunnyvale, CA (US)

(73) Assignee: WebTV Networks, Inc., Mountain View, CA (US)

( * ) Notice: Subject to any disclaimer, the term of this patent is extended or adjusted under 35 U.S.C. 154(b) by 0 days.

(21) Appl. No.: 09/570,329

(22) Filed: May 12, 2000

(51) Int. Cl.
*G06F 15/16* (2006.01)

(52) U.S. Cl. ...................... 709/238; 709/232; 709/223; 709/203; 709/224

(58) Field of Classification Search ................. 709/238, 709/203, 224, 223, 232, 234
See application file for complete search history.

(56) References Cited

U.S. PATENT DOCUMENTS

| | | | | |
|---|---|---|---|---|
| 6,006,264 A | * | 12/1999 | Colby et al. ................. | 709/226 |
| 6,041,354 A | * | 3/2000 | Biliris et al. ................. | 709/226 |
| 6,286,052 B1 | * | 9/2001 | McCloghrie et al. ........ | 709/238 |
| 6,721,272 B1 | * | 4/2004 | Parnafes et al. ............. | 370/235 |
| 6,772,225 B1 | * | 8/2004 | Jennings et al. ............. | 709/240 |
| 2001/0030970 A1 | * | 10/2001 | Wiryaman et al. .......... | 370/401 |

* cited by examiner

*Primary Examiner*—Ario Etienne
*Assistant Examiner*—Barbara Burgess
(74) *Attorney, Agent, or Firm*—Workman Nydegger

(57) ABSTRACT

Methods and computer program products are disclosed for providing Qos for Web applications via an internet service application programming interface ("ISAPI") filter running on an internet information server, wherein the ISAPI filter uses a traffic control application programming interface to manage bandwidth for individual HTTP requests. Responses to HTTP requests can be prioritized based on policies defined by the Web application developer, wherein policy decisions may be made based on many different parameters, such as, for example, the IP address of the Web browser making the request, the type of browser being used, HTTP "cookies," the uniform resource locator being requested, an authenticated user ID, or any other information that is exposed from the internet information server through server variables. The present invention accomplishes this with no modifications to the internet information server, and with very minimal changes to the Web application.

23 Claims, 3 Drawing Sheets

METHODS AND COMPUTER PROGRAM PRODUCTS FOR PROVIDING NETWORK QUALITY OF SERVICE FOR WORLD WIDE WEB APPLICATIONS

BACKGROUND OF THE INVENTION

1. The Field of the Invention

The present invention relates to methods and computer program products for processing hypertext transfer protocol ("HTTP") requests received via a computer network and, more particularly, to methods and computer program products for prioritizing the processing and transmission of responses to such HTTP requests.

2. The Relevant Technology

The rapid growth in computer network traffic during recent years has placed increasing demands on networks and their administrators. Increased network usage leads to increased congestion and compromises the network end user's experience. One solution is to add additional network capacity in an attempt to relieve the congestion, but that solution may suffice for only a relatively short period of time before the network is congested again and the cycle repeats.

Quality of Service ("QoS") mechanisms enable a network administrator to more effectively manage network resources. These mechanisms have the effect of simultaneously improving the network service experienced by end users and reducing the rate at which capacity must be increased, by allowing network administrators to prioritize network traffic. More specifically, QoS provides a mechanism to give priority to certain packets by marking them so that devices on the network can give these packets priority as opposed to other packets.

The popularity of one particular network, the internet, has exploded in recent years. Unfortunately, however, QoS mechanisms are not currently provided for processing HTTP requests received via the internet. Therefore, what is needed is a QoS mechanism that allows Web administrators to provide priority to certain HTTP requests based on criteria or policies defined by the Web administrator based on the unique needs and service requirements of the particular Web application.

SUMMARY AND OBJECTS OF THE INVENTION

The present invention provides QoS for Web applications via an internet service application programming interface ("ISAPI") filter running on an internet information server, wherein the ISAPI filter uses a traffic control application programming interface to manage bandwidth for individual HTTP requests. Responses to HTTP requests can be prioritized based on policies defined by the Web application developer, wherein policy decisions may be made based on many different parameters, such as, for example, the IP address of the Web browser making the request, the type of browser being used, HTTP "cookies," the uniform resource locator ("URL") being requested, an authenticated user ID, or any other information that is exposed from the internet information server through server variables. The present invention accomplishes this with no modifications to the internet information server, and with very minimal changes to the Web application.

It is, therefore, an object of the present invention to provide methods and computer program products for providing QoS protocols for responding to HTTP requests received via a computer network. An additional object of the invention is to provide methods and computer program products for prioritizing the processing and transmission of responses to HTTP requests received via a computer network based on criteria that can be tailored to the needs and service requirements of a particular web application.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Figure 1:
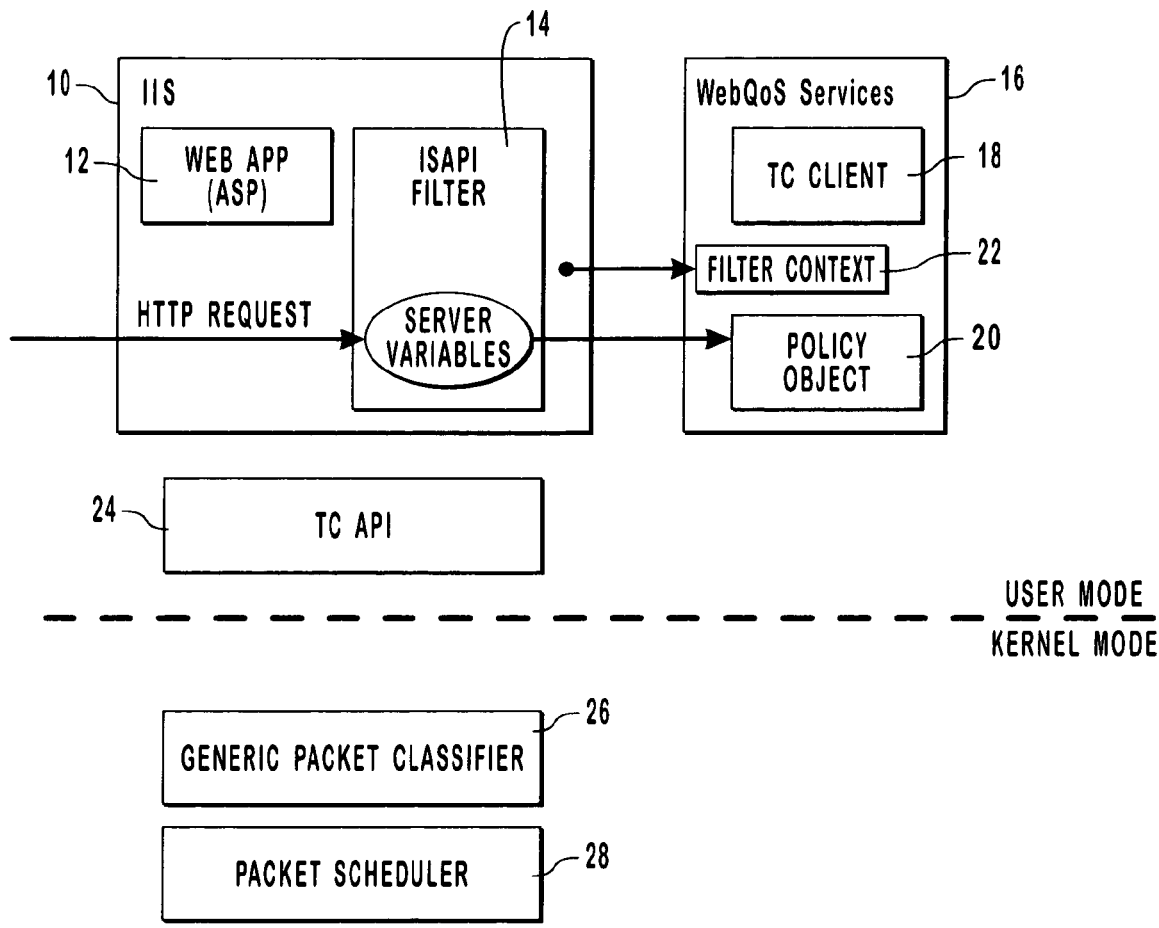
FIG. 1 graphically illustrates, in block diagram form, the architecture of one presently preferred embodiment of the present invention.

The present invention provides QoS for Web applications via an ISAPI filter that uses a traffic control application programming interface ("API") to manage bandwidth for individual HTTP requests. Responses to HTTP requests can be prioritized based on policies defined by the Web application developer, wherein policy decisions may be made based on many different parameters, such as: the IP address of the Web browser; the type of browser being used; HTTP "cookies"; the URL being requested; an authenticated user ID; or any other information that is exposed through IIS "Server Variables." The present invention accomplishes this with no modifications to IIS itself, and with very minimal changes to the Web application.

The present invention consists of an ISAPI filter, a Traffic Control client, and a Policy Module. A web server provides an API known as ISAPI, which allows a dynamic link library ("DLL") to hook into the web server at a very low level, and most importantly allows the DLL to register for notifications about individual HTTP requests. In response to those requests, the DLL can read information from the HTTP header (such as cookies, authentication information, etc.), and can make modifications, as needed, to the request. The present invention makes use of ISAPI to allow it to configure Qos in response to a HTTP request.

The present invention also includes a Traffic Control client that allows it to configure QoS flows and filters on behalf of the Web application. This module maintains a list of currently running network interfaces, and maintains flows and filters on those interfaces. It correctly handles cases where interfaces are going down or coming online, and also handles network address changes transparently.

A Policy Module is a simple COM object that specifies the mappings between HTTP requests and QoS flows. For example, it might specify that all HTTP requests that are made by a particular user get priority over all other HTTP requests, or it might specify that a particular HTML document should get priority over other documents. These mappings are specific to the particular application that is running on the server.

A Web application specifies which policy module it would like to use through a simple COM interface (IAppContext) that is exposed by the WebQoS service. This is typically done in the global.asa file of the Web application, and is done by creating an instance of "WebQos.AppContext" and calling the "CreatePolicyModule" method, passing the ProgID of the desired policy module. This configures the WebQoS service with the correct policy module so that future HTTP requests will be referred to this module for assignment to a QoS flow.

One presently preferred embodiment of the present invention, designed to operate with Microsoft Internet Information Server 5.0 ("IIS") and Microsoft Windows 2000, is described herein. It will be appreciated, however, that the principles disclosed herein can be readily adapted by those skilled in the art to achieve the same functions and advantages in connection with other operating systems and web server applications. The present invention is also designed in such a way that it is fully compliant with RFC 2474 of the Internet Engineering Task Force, a copy of which is available at www.ietf.org and which is incorporated herein by reference.

Figure 2:
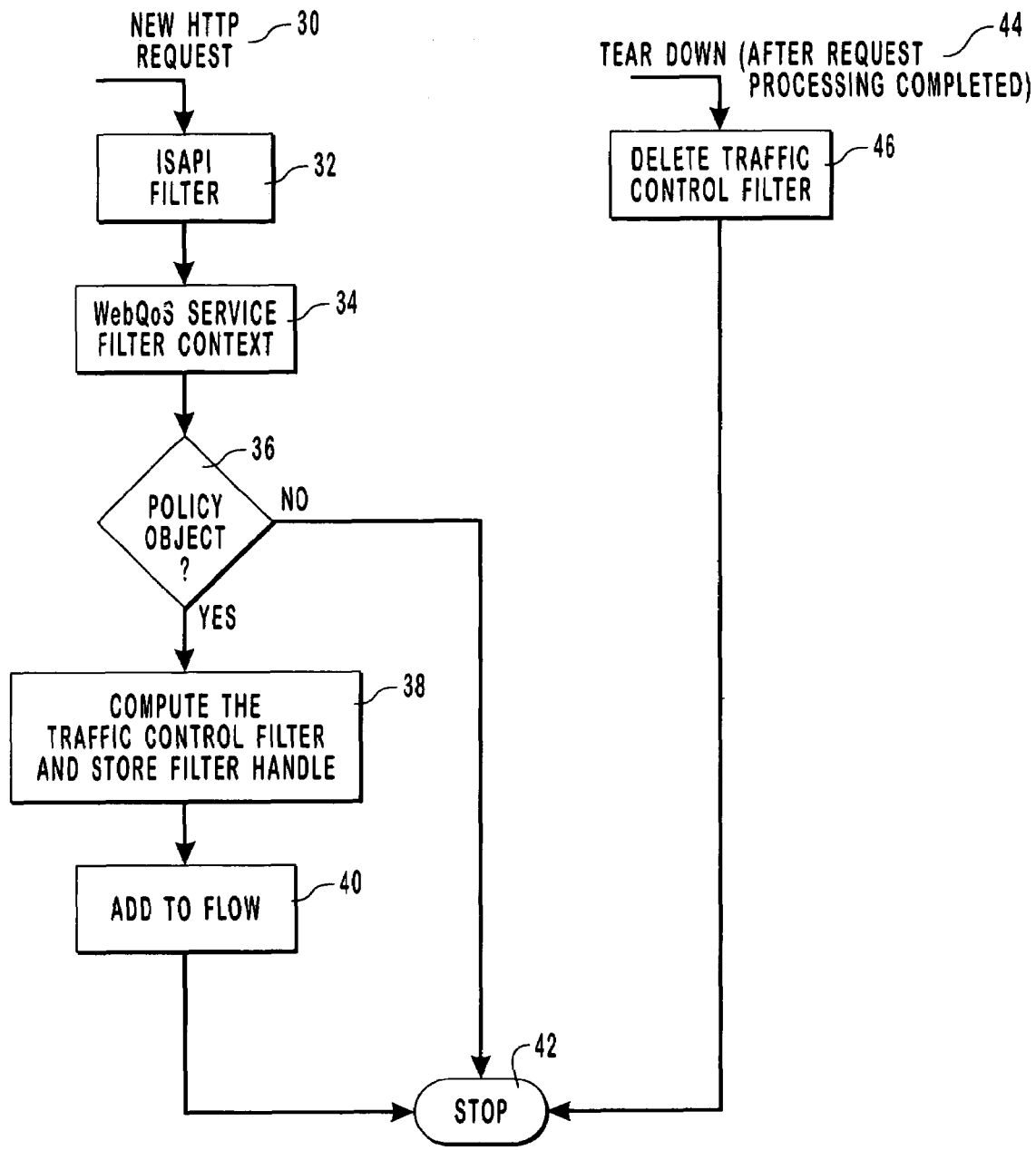
FIG. 2 illustrates a high level logic flow diagram of one presently preferred embodiment of the present invention.

One presently preferred embodiment of the present invention will now be described in more detail with reference to FIGS. 1–3. Referring first to FIG. 1, which graphically illustrates in functional block diagram form the architecture of one presently preferred embodiment of the present invention, the present invention includes IIS 10 having several processes, including a Web application ("Web App") 12. In one presently preferred embodiment of the present invention, Web application 12 includes active server pages ("ASP"), which processes script files and produces the actual Web pages in response to HTTP requests received from Web clients. The other IIS device is an ISAPI Filter 14, which monitors every HTTP request that is made on IIS 10 and filters and modifies those requests as needed.

The present invention also makes use of Traffic Control API 24, Generic Packet Classifier 26 and Packet Scheduler 28, which are existing software components available in Windows 2000. Traffic Control API 24 provides an interface layer between IIS 10, which operates in user mode, and Generic Packet Classifier 26 and Packet Scheduler 28, which operate in kernel mode. Once IIS 10 generates a response to a particular HTTP request, IIS 10 passes the response, which typically takes the form of one or more outbound packets, via Traffic Control API 24 to Generic Packet Classifier 26 and Packet Scheduler 28, which together handle scheduling and transmitting the packets back out over the network to the client making the request. Additional details concerning Generic Packet Classifier 26 are disclosed in co-pending U.S. patent application Ser. No. 08/933,868, filed Sep. 19, 1997, and entitled "Method and Computer Program Product for Classifying Network Communication Packets Processed in a Network Stack," the discloser of which is incorporated herein by reference. Additional details concerning Packet Scheduler 28 are disclosed in co-pending U.S. patent application Ser. No. 09/094,045, filed Jun. 9, 1998, and entitled "Method and Computer Program Product for Scheduling Network Communication Packets Originating from Different Flows having Unique Service Requirements," the disclosure of which is incorporated herein by reference.

The present invention also includes an NT Service called WebQoS Service 16, which is a COM server and which consists of two basic components: a Traffic Control Client 18 and a Policy Object 20. Traffic Control Client 18 interfaces with Traffic Control API 24 and creates and manages flows and filters that are instrumental in providing QoS protocols for processing incoming HTTP requests. A flow is a class of traffic (i.e., a queue with an assigned priority relative to other flows/queues), and a filter is an association between particular packets and the flows. If a particular HTTP request satisfies the conditions for QoS processing, Traffic Control Client 18 creates a traffic control filter for that request, which includes the endpoints (i.e., source IP address and destination IP address) of the request, the flow to which the request is assigned, and a unique filter identifier. A handle to each filter created is provided to IIS 10, which is graphically illustrated in FIG. 1 as Filter Context 22.

As will be discussed in more detail below, Traffic Control Client 18, in combination with Generic Packet Classifier 26 and Packet Scheduler 28, perform pattern matching to compare each outbound packet (i.e., a packet destined to a Web client in response to a HTTP request received by IIS 10) with all filters that have been created so as to assign each packet to the appropriate flow as dictated by the Policy Object 20. If a packet matches one of the filters (each filter being associated with a particular flow), then the packet gets assigned to the queue associated with that flow.

Policy Object 20 is a COM object that defines the QoS policy for Web application 12. Policy Object 20 specifies, based on the particular service requirements and needs of Web application 12, criteria for prioritizing certain HTTP requests made on IIS 10. The only limitation on the criteria that may be used in formulating Policy Object 20 is that the criteria must be based on information (i.e., variables) that can be derived either from information that is included in the header of a HTTP request directly (such as, for example, the source IP address, the URL request, cookies, etc.) or information that can be derived from a HTTP request in combination with NT client-server authentication (such as, for example, the UserID of the user making the request). For example, a Web administrator could write a Single User Policy Object, an example of which will be discussed in more detail below, which prioritizes any request received from a specified user over requests received from all other users. In that example, Policy Object 20 would define a flow, or queue, whose priority is higher than the default mode of processing responses to HTTP requests, and packets generated by IIS 10 in response to requests from the specified user would be assigned to the higher priority flow. Another example is that a Web administrator could write Policy Object 20 so that any HTTP request specifying a URL indicative of the beginning of a purchase transaction (such as, for example, "Add to Shopping Cart" icon) is to be assigned to the highest priority flow available. Policy Object 20 can also specify multiple flows. For example, a Web administrator could define Policy Object 20 so that it assigns requests received from a first defined group of preferred customers to flow "LO," assigns requests received from a second defined group of more preferred customers to flow "MED," and assigns requests received from a third defined group of most preferred customers to flow "HI."

The foregoing are examples involving relatively simple criteria and logic designed to illustrate the broad principles of the present invention. Those skilled in the art will readily appreciate, however, that Policy Object 20 may incorporate complex logic to accommodate various criteria for providing prioritization and may specify multiple flows or levels of prioritization. Thus, Policy Object 20 can be as simple or as complex as needed by the service requirements of the particular Web application, and determines the flows and the criteria for a particular request to be assigned to a particular flow.

Returning again to the simple example of the Single User Policy Object, an example of how Policy Object would be written in such a way as to provide priority service to a specified user is set forth below:

SINGLE USER POLICY OBJECT

Initialize (Policy Context, Argument)
Store Argument => UserName
CreateFlow
StoreFlow => Flow
OnRequest (RequestContext)
this user = RequestContext.Get ServerVariables(User_ID)
if(this user = UserName)
    return Flow
else
    return Null The foregoing example includes two methods: Initialize and OnRequest. Initialize is responsible for defining the criteria required for a request to receive QoS treatment and for creating the desired flow or flows. In this example, the argument is an arbitrary argument that can be passed in from Web application 12 at the time it creates the object specifying whatever information the Policy Object 20 requires. In the case of a Single User policy, the argument gives the UserName of the user to whom priority treatment is to be given. The argument is stored as a global variable, called UserName, and then a flow is created, and the flow is stored locally inside the policy object. In other words, the Initialize methods defines the condition or conditions under which priority treatment will be accorded HTTP requests and also specifies one or more flows or levels of priority for responding to such requests.

One Policy Object 20 has been initialized, the processing of HTTP requests subsequently received by IIS 10 is illustrated in the flow diagram provided in FIG. 2. When a new HTTP request is received by IIS 10, as indicated at step 30, ISAPI Filter 14 notifies WebQoS Service 16 that a new request has been received, as indicated at step 32. At step 34, ISAPI Filter 14 calls Policy Object 20 via Filter Context 22. OnRequest gets called for every time ISAPI Filter 14 calls Policy Object 20, namely, once for each incoming HTTP request. At the point that all of the headers have been processed, parameters are requested by calling Request Context, which is a method for retrieving the necessary information, available through Server Variables, to determined whether the request satisfies the conditions specified in Policy Object 20, as indicated by step 36. In the case of Single User Policy, the Server Variable called UserID is received and assigned to ThisUser. In this example, if ThisUser (UserID) is the same as the UserName stored in the Policy Object, then the request is assigned (in the manner discussed below) to the flow specified in Policy Object 20.

If a request is received by IIS 10 that satisfies one or more criteria specified in Policy Object 20, then that request (and the packets generated in response to that request) are associated with the appropriate flow specified in Policy Object 20 in the following manner. In the present example, if the UserID derived from the HTTP request matches the UserName specified in Policy Object 20, then, as indicated at step 38, a traffic control filter is generated, which is stored and exposed to the Generic Packet Classifier 26 and Packet Scheduler 28. The resulting traffic control filter includes the endpoint information of the request, identifies the flow specified in the Policy Object to which the request is assigned, and a unique identifier. The resulting traffic control filter is added to the appropriate flow, as indicated at step 40, and then the WebQoS process ends as indicated at step 42.

On the other hand, if the UserID derived from the newly received request does not match the UserName specified in the Policy Object, then no traffic control filter is created for that request, and the WebQoS process ends as indicated at step 42. In that case, the request and packets responding to that request are handled according to whatever default processing discipline is built into Generic Packet Classifier 26 and Packet Scheduler 28.

Figure 3:
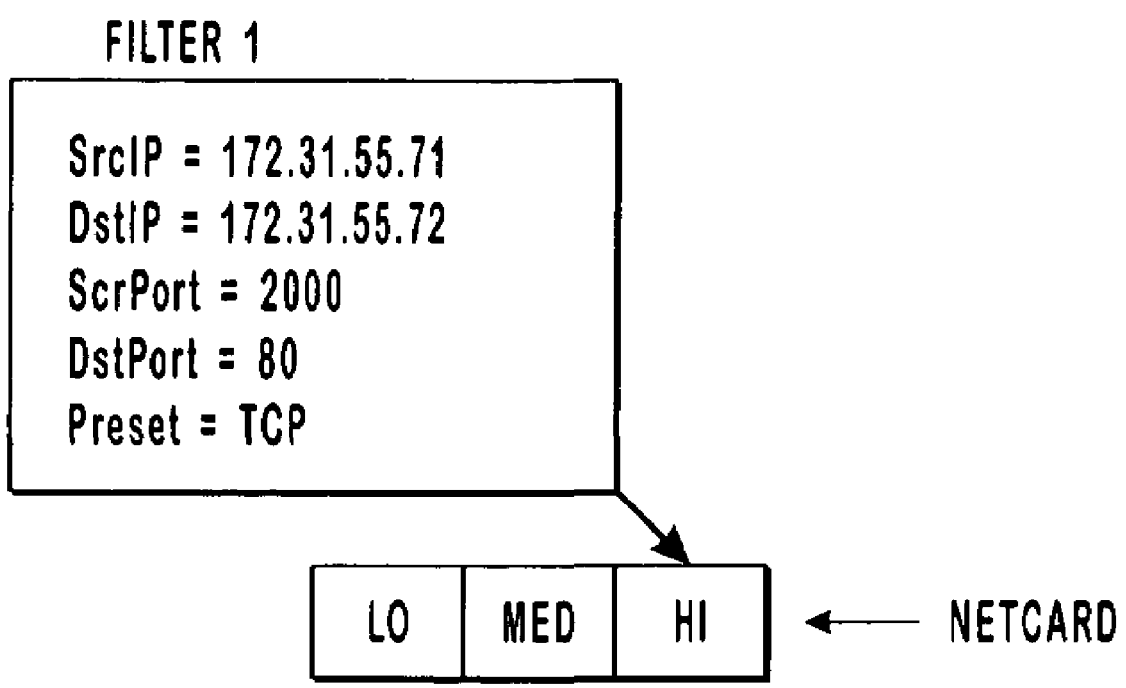
FIG. 3 graphically illustrates, one instance of a filter object in accordance with one presently preferred embodiment of the present invention.

An example of such a traffic control filter, labeled "Filter 1," is graphically illustrated in FIG. 3. In this example, the traffic control filter specifies the source IP address, the destination IP address, the source port, the destination port and the transfer protocol, all of which relates directly back to the pending request that satisfied the conditions of Policy Object 20. And, as graphically indicated, Filter 1 is assigned to flow "HI."

As IIS 10 responds to each received request, one or more packets are generated which, when taken together, form a response to a given request. The header of each outbound packet includes a source IP address and a destination IP address, which mirror the source and destination IP addresses of the request to which the packet is responsive. For each outbound packet that is received by Packet Scheduler 28 for transmission, Generic Packet Classifier 26 compares the endpoints specified in the packet header to the endpoints specified in all traffic control filters that exist at that time within the context of the WebQoS Service 16. If the endpoints specified in the packet match the endpoints specified in a given traffic control filter, then Generic Packet Classifier 26 determines the flow associated with that traffic control filter and passes the packet and the flow to which that packet is to be assigned to Packet Scheduler 28. Referring again to FIG. 2, once the request has been completed, IIS 10 receives notification of the completion of the request, and ISAPI Filter 14 makes another call to WebQoS Service 16 specifying the traffic control filter associated with the completed request, as indicated at step 44, and WebQoS Service 16 tears down the traffic control filter associated with that request as indicated at step 46.

Methods in accordance with the present invention are implemented follows. When an HTTP request is received, the IIS 10 digests all of the header information. Then just before a response is returned, the WebQos Service 16 tests to see if the request satisfies any of the conditions specified in Policy Object 20, which has been predefined based on the needs and services requirements of the particular Web application, which specifies one or more criteria for providing prioritized processing of particular requests, and which assigns priority one or more flows for prioritized processing of requests satisfying the applicable specified criteria. If an incoming request satisfies one or more of the criteria specified in Policy Object 20, Traffic Control Client 18 creates a traffic control filter, which is associated with that particular request and which is assigned to the particular flow specified in Policy Object 20. The stored traffic control filters are exposed for use by Generic Packet Classifier 26 and Packet Scheduler 28 in scheduling transmission of the packets. IIS 10 then generates packets in response to the request, which are passed to Packet Scheduler 28. Packet Scheduler 28, through Generic Packet Classifier 26 compares the endpoints contained in the header of each outbound packet to all existing packet control filters to determine whether that particular packet is assigned to a particular flow. Then, Packet Scheduler 28 schedules transmission of the packet based on its assigned flow. Once IIS 10 finishes responding to the request, it notifies WebQoS Service 16, which deletes the filter associated with the request.

Computer program products in accordance with the present invention comprise a computer readable medium having computer executable code means embodied in said medium for performing, in cooperation with a computer, the methods disclosed herein. It should be understood that the particular computer medium is not critical to the present invention, but that the present invention can be used in connection with any type of media, now known or that may be developed in the future, that is capable of storing data that is accessible by a computer, including, but not limited to, hard drives, magnetic disks or cassettes, optical disks, random access memory, read only memory, flash memory cards, compact disks, digital video disks, Bernoulli cartridges, or any other media now existing or that may be developed in the future.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method for prioritizing a server's responses to HTTP requests received by the server from a client via a computer network, the method comprising:
    defining a policy object at the server specifying (i) one or more conditions to be met in order to prioritize a HTTP request received by the server, and (ii) one or more flows, corresponding to the one or more conditions, that prioritize the server's processing of the HTTP request;
    registering to receive notices of HTTP requests;
    receiving notice of an HTTP request of the client;
    determining that the HTTP request satisfies the one or more conditions specified in the policy object;
    upon determining that the HTTP request satisfies the one or more conditions, generating a traffic control filter corresponding to the HTTP request for scheduling transmission of a response to the HTTP request, wherein the traffic control filter is generated in response to determining that the HTTP request satisfies the one or more conditions;
    upon generating the traffic control filter, generating and transmitting a response to the HTTP request using the one or more flows specified in the policy object that prioritize the server's processing of the HTTP request, wherein the response is transmitted according to a schedule specified by the traffic control filter;
    wherein the method further includes:
        for each packet,
            comparing endpoints of the packet with endpoints specified in the filter; and
            prioritizing the processing and transmission of any packet whose endpoints correspond to the endpoints of the filter based on the flow associated with the filter and a predefined flow discipline; and
        deleting the filter after completion of the HTTP request that satisfies the one or more conditions.

2. The method of claim 1, wherein the defining step comprises:
    defining a first condition for providing priority treatment to the HTTP request and specifying a first flow for HTTP requests that satisfy the first condition; and
    defining a second condition for providing priority treatment to the HTTP request and specifying a second flow for HTTP requests that satisfy the second condition.

3. The method of claim 2, wherein the first flow and second flow can be the same or different.

4. The method of claim 1 wherein the server has a protocol for authenticating requests received from the client and wherein each HTTP request includes a request header that contains certain information about the request.

5. The method of claim 4 wherein the one or more conditions specified in the policy object are based on information contained in the request header.

6. The method of claim 4 wherein the one or more conditions specified in the policy object are based on information contained in the request header in combination with information derived from the authentication protocol.

7. The method of claim 6 wherein the determining step comprises comparing information from the request header with the one or more conditions specified in policy object.

8. The method of claim 7 wherein the determining step further comprises creating, for the HTTP request, a filter that is associated with the request and is assigned to one of the one or more flows specified in the policy object.

9. The method of claim 8 wherein the filter includes the endpoints of the request, the flow to which the request is assigned, and a unique identifier.

10. A method as recited in claim 1, wherein the one or more conditions includes a type of browser.

11. A method as recited in claim 1, wherein the one or more conditions includes a request for a particular type of cookie.

12. A method as recited in claim 1, wherein registering to receive notices of HTTP requests includes a DLL registering for notifications about individual HTTP requests through an ISAPI filter.

13. A method as recited in claim 1, wherein the one or more flows comprise a low, medium and high flow, such that response is transmitted with one of the low, medium and high flows.

14. A method as recited in claim 1, wherein the HTTP request comprises a Web browser request received over the Internet.

15. A method for prioritizing a server's responses to HTTP request received via a computer network from a client, the method comprising:
    defining a policy object at the server specifying one or more conditions for receiving priority treatment and specifying one or more flows;
    for each HTTP request of the client received by the server, determining whether the HTTP request satisfies any of the one or more conditions specified in the policy object; and
    for each HTTP request that satisfies any of the conditions specified in the policy object,
    upon determining that the HTTP request satisfies the one or more conditions, creating a traffic control filter for said request, wherein the traffic control filter is associated with the request and is assigned to one of the one or more flows specified in the policy object, wherein the traffic control filter is generated in response to determining that the HTTP request satisfies the one or more conditions;

upon generating the traffic control filter, generating a response to the request comprising one or more packets, each packet being associated with the traffic control filter of the request to which the packet is responsive;

transmitting the one or more packets based on a predefined flow discipline, wherein the packets are prioritized and are processed and transmitted based on the flow to which the traffic control filter is assigned wherein said transmitting includes:

for each packet,
comparing endpoints of the packet with endpoints specified in the traffic control filter; and
prioritizing the processing and transmission of any packet whose endpoints correspond to the endpoints of the traffic control filter based on the flow associated with the filter and a predefined flow discipline; and deleting the filter after completion of the HTTP request that satisfies the one or more conditions.

16. The method of claim 15, wherein the defining step comprises:
defining a first condition for providing priority treatment to a HTTP request and specifying a first flow of HTTP requests that satisfy the first condition; and
defining a second condition for providing priority treatment to a HTTP request and specifying a second flow for HTTP requests that satisfy the second condition.

17. The method of claim 16, wherein the first flow and second flow can be the same or different.

18. The method of claim 15 wherein the traffic control filter includes the endpoints of the request, the flow to which the request is assigned, and a unit identifier.

19. A method as recited in claim 15, further comprising:
for each HTTP request that does not satisfy any of the conditions specified in the policy object,
generating and transmitting the HTTP request according to default processing rules, and without generating a traffic control filter corresponding to the HTTP request for scheduling transmission of a response to the HTTP request.

20. A method for prioritizing a server's responses to one or more HTTP requests received via a computer network from a client for use in connection with a system that utilizes a generic packet classifier and a packet scheduler, comprising:
defining a policy object at the server specifying one or more conditions for providing priority treatment and specifying one or more flows;
for each HTTP request of the client received by the server, determining whether the HTTP request satisfies any of the one or more conditions specified in the policy objects; and
for each HTTP request that satisfies any of the one or more conditions specified in the policy object,
upon determining that the HTTP request satisfies the one or more conditions, creating a traffic control filter for said request, wherein the traffic control filter is generated in response to and determining that the HTTP request satisfies the one or more conditions, and wherein the traffic control filter includes the endpoints of the HTTP request, is assigned to one or said one or more flows specified in the policy object, and stores a filter handle for the traffic control filter that is exposed to the generic packet classifier;

upon generating the traffic control filter, generating responses to the one or more HTTP requests, each response comprising one or more packets with each packet including its endpoints;

for each packet,
comparing, by the generic packet classifier, the endpoints of the packet with the endpoints specified in any of the traffic control filters; and
prioritizing the processing and transmission of any packet whose endpoints correspond to the endpoints of any of the traffic control filters based on the flow associated with corresponding traffic control filter and a predefined flow discipline; and after each request has been completed, deleting the traffic control filter associate with the completed request.

21. A computer program product for prioritizing a server's responses to HTTP requests received by the server from a client via a computer network, the computer program product comprising a computer-readable storage medium having computer-executable instructions for performing the following:
defining a policy object at the server specifying (i) one or more conditions to be met in order to prioritize a HTTP request received by the server, and (ii) one or more flows, corresponding to the one or more conditions, that prioritize the server's processing of the HTTP request;
registering to receive notices of HTTP requests;
receiving notice of an HTTP request of the client;
determining that the HTTP request satisfies the one ore more conditions specified in the policy object;
upon determining that the HTTP request satisfies the one or more conditions, generating a traffic control filter corresponding to the HTTP request for scheduling transmission of a response to the HTTP request, wherein the traffic control filter is generated in response to determining that the HTTP request satisfies the one or more conditions;
upon generating the traffic control filter, generating and transmitting a response to the HTTP request using the one or more flows specified in the policy object that prioritize the server's processing of the HTTP request, wherein the response is transmitted according to a schedule specified by the traffic control filter;
wherein the method further includes;
for each packet,
comparing endpoints of the packet with endpoints specified in the filter; and
prioritizing the processing and transmission of any packet whose endpoints correspond to the endpoints of the filter based on the flow associated with the filter and a predefined flow discipline; and
deleting the filter after completion of the HTTP request that satisfies the one or more conditions.

22. A computer program product for prioritizing a server's responses to HTTP requests received by a server from a client via a computer network, the computer program product comprising a computer-readable storage medium having computer-executable instructions for performing the steps of:
defining a policy object at the server specifying one or more conditions for receiving priority treatment and specifying one or more flows;

for each HTTP request of the client received by the server, determining whether the HTTP request satisfies any of the one or more conditions specified in the policy object; and for each received HTTP request that satisfies any of the conditions specified in the policy object,
- upon determining that the HTTP request satisfies the one or more conditions, creating a traffic control filter for said request, wherein the traffic control filter is associated with the request and is assigned to one of the one or more flows specified in the policy object, wherein the traffic control filter is generated in response to determining that the HTTP request satisfies the one or more conditions;
- upon generating the traffic control filter, generating a response to the request comprising one or more packets, each packet being associated with the traffic control filter of the request to which the packet is responsive;
- transmitting the one or more packets based on a predefined flow discipline, wherein the packets are prioritized and are processed and transmitted based on the flow to which the traffic control filter is assigned, wherein said transmitting includes:
- for each packet,
  - comparing endpoints of the packet with endpoints specified in the traffic control filter; and
  - prioritizing the processing and transmission of any packet whose endpoints correspond to the endpoints of the traffic control filter based on the flow associated with the filter and a predefined flow discipline; and
- deleting the filter after completion of the HTTP request that satisfies the one or more conditions.

23. A computer program product for prioritizing a server's responses to HTTP requests received by a server from a client via a computer network, the computer program product comprising a computer-readable storage medium having computer-executable instructions for performing the steps of:

defining a policy object at the server specifying one or more conditions for providing priority treatment and specifying one or more flows;

for each HTTP request of the client received by the server,
- determining whether the HTTP request satisfies any of the one or more conditions specified in the policy objects; and for each HTTP request that satisfies any of the one or more conditions specified in the policy object,
- upon determining that the HTTP request satisfies the one or more conditions, creating a traffic control filter for said request, wherein the traffic control filter is generated in response to determining that the HTTP request satisfies the one or more conditions, and wherein the traffic control filter includes the endpoints of the HTTP request, is assigned to one or said one or more flows specified in the policy object, and storing a filter handle for the traffic control filter that is exposed to the generic packet classifier;
- upon generating the traffic control filer, generating responses to the one or more HTTP requests, each response comprising one or more packets with each packet including its endpoints;

for each packet,
- comparing, by the generic packet classifier, the endpoints of the packet with the endpoints specified in any of the traffic control filters; and
- prioritizing the processing and transmission of any packet whose endpoints correspond to the endpoints of any of the traffic control filters based on the flow associated with corresponding traffic control filter and a predefined flow discipline; and after each request has been completed, deleting the traffic control filter associate with the completed request.

* * * * *